(12) United States Patent
Sharma

(10) Patent No.: US 12,124,633 B2
(45) Date of Patent: Oct. 22, 2024

(54) USING NATURAL MOVEMENTS OF A HAND-HELD DEVICE TO MANIPULATE DIGITAL CONTENT

(71) Applicant: TEXAS INSTRUMENTS INCORPORATED, Dallas, TX (US)

(72) Inventor: Vinay Sharma, San Francisco, CA (US)

(73) Assignee: Texas Instruments Incorporated, Dallas, TX (US)

( * ) Notice: Subject to any disclaimer, the term of this patent is extended or adjusted under 35 U.S.C. 154(b) by 386 days.

(21) Appl. No.: 17/710,951

(22) Filed: Mar. 31, 2022

(65) Prior Publication Data

US 2022/0221943 A1     Jul. 14, 2022

Related U.S. Application Data

(63) Continuation of application No. 17/088,383, filed on Nov. 3, 2020, now Pat. No. 11,301,051, which is a
(Continued)

(51) Int. Cl.
*G06F 3/01*     (2006.01)
*G06F 3/00*     (2006.01)
(Continued)

(52) U.S. Cl.
CPC ............ *G06F 3/017* (2013.01); *G06F 3/0317* (2013.01); *G06F 3/0346* (2013.01); *G06F 3/0482* (2013.01); *G06F 3/04845* (2013.01); *G06T 3/18* (2024.01); *G06T 7/73* (2017.01); *G06T 15/04* (2013.01); *G09G 5/377* (2013.01); *H04N 9/3185* (2013.01); *H04N 9/3194* (2013.01); *G06F 3/005* (2013.01);
(Continued)

(58) Field of Classification Search
CPC ........... G06F 2203/04806; G06F 3/005; G06F 3/017; G06F 3/0317; G06F 3/0346; G06F 3/0482; G06F 3/04845; G06T 15/04; G06T 3/18; G06T 7/73; G09G 2320/0261; G09G 2340/0464; G09G 2354/00; G09G 5/377
See application file for complete search history.

(56) References Cited

U.S. PATENT DOCUMENTS 6,522,787 B1 * 2/2003 Kumar .................. H04N 5/272
                                                                                348/E5.022
8,493,384 B1     7/2013 Reisman
(Continued)

OTHER PUBLICATIONS

Rodrigues et al: "Camera Pose Estimation Using Images of Planar Mirror Reflections", ECCV, 2010. (Year: 2010).*
(Continued)

*Primary Examiner* — Ruiping Li
(74) *Attorney, Agent, or Firm* — Carl G. Peterson; Frank D. Cimino

(57) ABSTRACT

A mobile device, such as a smart phone, is provided with a camera. Digital content displayed on display screen of the mobile device may be manipulated in response to natural movements of the mobile device by a user. Motion of the mobile device is detected relative to a nearby textured surface by analyzing images of the textured surface. The displayed digital content is manipulated in response to the detected motion of the mobile device.

20 Claims, 12 Drawing Sheets

Related U.S. Application Data continuation of application No. 16/169,363, filed on Oct. 24, 2018, now Pat. No. 10,866,647, which is a continuation of application No. 15/345,164, filed on Nov. 7, 2016, now Pat. No. 10,152,137, which is a continuation of application No. 14/144,254, filed on Dec. 30, 2013, now Pat. No. 9,489,925.

(60) Provisional application No. 61/748,777, filed on Jan. 4, 2013.

(51) Int. Cl.
| | |
|---|---|
| *G06F 3/03* | (2006.01) |
| *G06F 3/0346* | (2013.01) |
| *G06F 3/0482* | (2013.01) |
| *G06F 3/04845* | (2022.01) |
| *G06T 3/18* | (2024.01) |
| *G06T 7/73* | (2017.01) |
| *G06T 15/04* | (2011.01) |
| *G09G 5/377* | (2006.01) |
| *H04N 9/31* | (2006.01) |

(52) U.S. Cl.
CPC .............. *G06F 2203/04806* (2013.01); *G09G 2320/0261* (2013.01); *G09G 2340/0464* (2013.01); *G09G 2354/00* (2013.01)

(56) References Cited

U.S. PATENT DOCUMENTS

| | | |
|---|---|---|
| 8,754,831 B2 | 6/2014 | Kollin et al. |
| 9,235,894 B2 * | 1/2016 | Benhimane ............... G06T 7/74 |
| 9,237,340 B2 | 1/2016 | Sharma et al. |
| 9,264,679 B2 | 2/2016 | Tickoo et al. |
| 9,293,118 B2 | 3/2016 | Matsui |
| 9,747,870 B2 | 8/2017 | Gillard |
| 2005/0024324 A1 | 2/2005 | Tomasi |
| 2006/0238502 A1 | 10/2006 | Kanamori |
| 2009/0033785 A1 | 2/2009 | Fujinawa et al. |
| 2010/0099464 A1 | 4/2010 | Kim |
| 2011/0075102 A1 | 3/2011 | Nozaki et al. |
| 2012/0038546 A1 | 2/2012 | Cromer |
| 2012/0200588 A1 | 8/2012 | Posa |
| 2012/0313974 A1 | 12/2012 | Ueno |
| 2015/0123993 A1 | 5/2015 | Ohba |

OTHER PUBLICATIONS

"Digital Light Processing", Wikipedia, available at http://en.widipedia.org/wiki/Digital_Light_Processing on Dec. 5, 2013, 8 pages.

"DLP Pico Projectors", Texas Instruments, pp. 1-2, available at www.dlp.com/pico-projector/phone/default.aspx on Dec. 5, 2013, 2 pages.

"How DLP Technology Works", DLP Technology, Texas Instruments, available at www.dlp.com/technology/how-dlp-works/default.aspx on Dec. 5, 2013, 2 pages.

* cited by examiner

USING NATURAL MOVEMENTS OF A HAND-HELD DEVICE TO MANIPULATE DIGITAL CONTENT

CLAIM OF PRIORITY UNDER 35 U.S.C. 119(e)

This application is a continuation of Ser. No. 17/088,383, filed Nov. 3, 2020, which is a continuation of U.S. patent application Ser. No. 16/169,363, filed Oct. 24, 2018, now U.S. Pat. No. 10,866,647, granted Dec. 15, 2020, which is a continuation of U.S. patent application Ser. No. 15/345,164, filed Nov. 7, 2016, now U.S. Pat. No. 10,152,137, granted Dec. 11, 2018, which is a continuation of U.S. patent application Ser. No. 14/144,254, filed Dec. 30, 2013, now U.S. Pat. No. 9,489,925, granted Nov. 8, 2016, which claims priority to U.S. Provisional Application No. 61/748,777 filed Jan. 4, 2013, all of which are hereby incorporated by reference in their entireties.

BACKGROUND OF THE INVENTION

Field of the Invention

Embodiments of the present invention generally relate to manipulation of digital content by movement of a mobile device.

Description of the Related Art

Portable devices like smart phones and tablets typically have small screens compared to conventional desktop computers. Yet, the content provided on these devices is progressively getting richer, more complex and of higher resolution. A combination of these factors compels the user to engage in complex interactions with the device to fully enjoy the high resolution content on the small screen. For example, zooming and panning are very common interactions that are practically essential when viewing content such as high resolution images, maps, web pages, etc. Given the small screen area and the absence of conventional pointing devices such as a mouse, these user interactions are very cumbersome on mobile devices.

SUMMARY OF THE INVENTION

Embodiments of the invention allow a user of a mobile device, such as a smart phone, to manipulate digital content displayed on display screen of the mobile device in response to natural movements of the mobile device by the user. Motion of the mobile device may be detected relative to a nearby textured surface by analyzing images of the textured surface provided by a camera within the mobile device. The displayed digital content may be manipulated in response to the detected motion of the mobile device.

BRIEF DESCRIPTION OF THE DRAWINGS

Particular embodiments in accordance with the invention will now be described, by way of example only, and with reference to the accompanying drawings.

Figure 1:
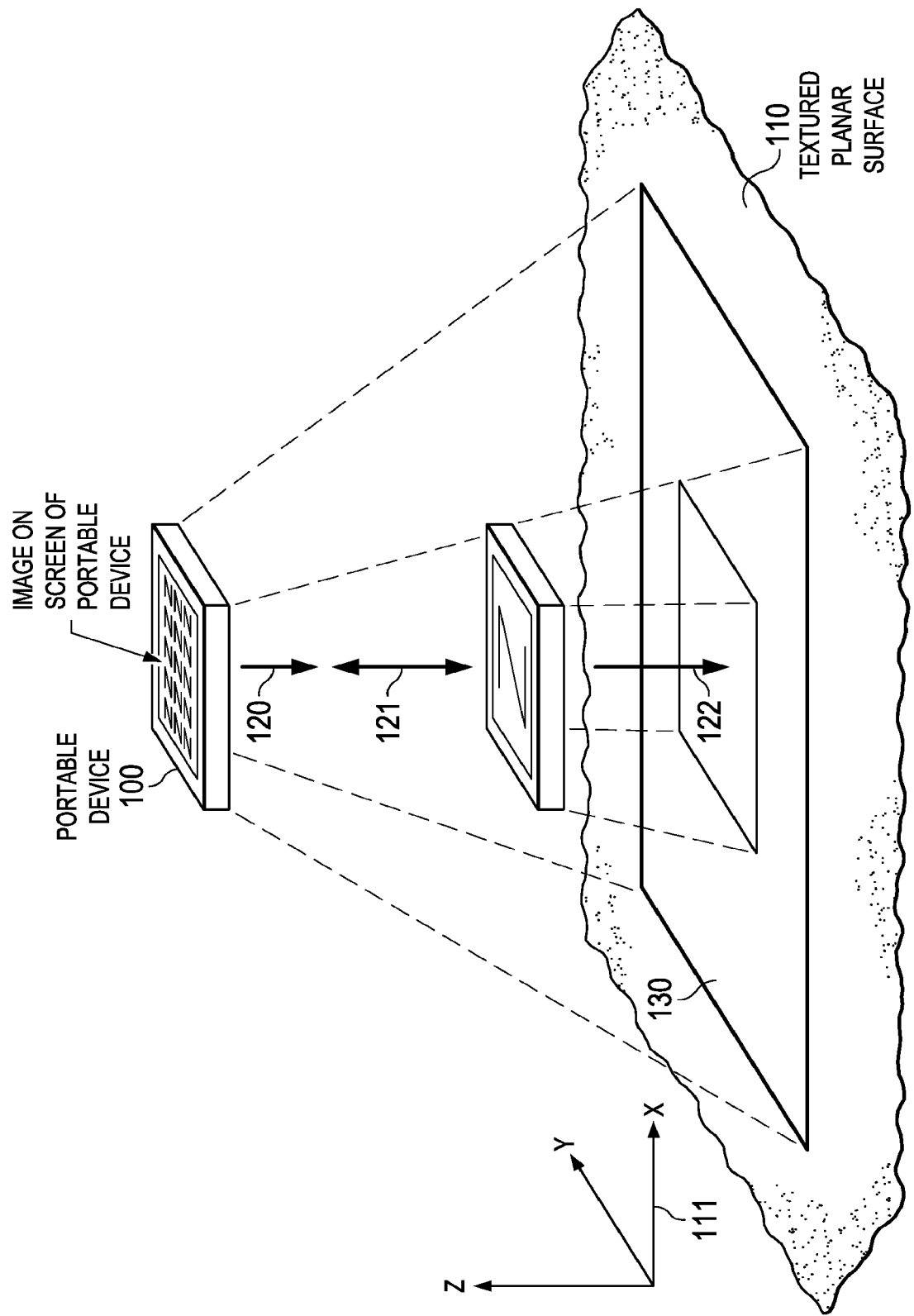
FIGS. 1-8 are illustrations of a smart phone being used to manipulate various digital content by movement of the smart phone.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency.

Portable devices like phones and tablets have small screens compared to conventional desktop computers. Yet, the content consumed on these devices is progressively getting richer, more complex and of higher resolution. A combination of these factors compels the user to engage in complex interactions with the device to fully enjoy the high resolution content on the small screen. For example, zooming and panning are very common interactions that are practically essential when viewing content such as high resolution images, maps, web pages, etc. Given the small screen area and the absence of conventional pointing devices such as a mouse, these user interactions are very cumbersome on mobile devices. Embodiments of the invention describe a user interface that may eliminate this problem.

Another limitation of the small screen-space on portable devices is the inability to resize application windows. Most application windows are allowed to be displayed in a single size. The user cannot modify the display content by changing the window size. Embodiments of the invention may provide a user-interface that enables a user to change application window sizes on a hand-held device.

Another consequence of a small screen is that there is very limited space for a user to have more than one application window open. Indeed, most mobile operating systems are designed to allow only a single open window displayed at a time. Embodiments of the invention may address the problem of limited screen space and the restriction on number of visible open application windows on portable devices.

Embodiments of the invention allow a portable device to be tracked in 3-D space with respect to a fixed reference coordinate system. Digital content may then be virtually positioned at a suitable location within this coordinate system. Knowing the position of the device with respect to this coordinate frame allows the portable device to transform the 3-D coordinates of the digital content to a 2-D image coordinate space as if the image were generated by a camera co-located with the device. As the device is moved around in 3-D space, the reference coordinate system remains fixed and hence the digital content remains locked in the chosen position within the coordinate frame. Periodically, the instantaneous position and pose information of the device is updated and using this information the digital content may be transformed from the 3-D coordinate space to 2-D image coordinates. The pixels of this image may be appropriately rendered to reflect the appearance (color, brightness, etc.) of the digital content. As the user sees these images on the screen of the portable device, the effect may be as though the digital content is positioned at a fixed location in 3-D space, and moving the device shows different aspects or perspective views of this content.

Estimating the pose of the handheld device in real time may be done using one of several known approaches that address this challenge to varying extents. A handheld device may be equipped with inertial navigational sensors such as accelerometers and gyroscopes. Kalman filtering may be used to improve sensor data accuracy, for example. Using readings from these sensors, a processor on the device may be able to identify the position, orientation, and velocity of the device in a world coordinate frame. Another complementary approach is made possible by detecting, recognizing, and tracking landmark points in the real world using a camera that may be included within the handheld device. This vision-based approach may then enable the handheld device to track the pose of the camera within a reference coordinate frame. Combining these two approaches to robustly estimate camera pose is a subject of ongoing research. Other approaches that directly or indirectly aid in camera pose estimation are also being discovered.

An embodiment of the invention will now be described that may rely on a vision-based camera pose estimation method as the positional reference. However, in other embodiments, the various user-interface solutions described herein may rely on other known of later developed pose tracking techniques, such as inertial sensors, GPS (global position system) sensors, etc., for example.

A brief overview of a camera-based approach based on current technology will now be described. A more detailed description of camera based pose tracking will be described in more detail later in this disclosure. This solution requires the mobile device to have a camera, typically located with a view to the rear of the device opposite from the display screen. The internal parameters of this camera, namely the focal length, the pixel aspect ratio, and the pixel skew are assumed to be known. The camera needs to be on (active) while this particular approach is being used.

Computer vision algorithms are employed to detect and track distinguishable "landmark" points in the visible scene. If these points are correctly tracked as the camera moves in 3-D space, and the spatial configuration of these points remains rigid, algorithms exist that can solve for the position and orientation of the camera within a coordinate frame assumed to be registered to the rigid world landmark points. These vision algorithms are well known and have been used for applications like visual odometry and augmented reality (AR). The proposed user interface model is most closely related to the latter. In general, AR is a live, direct, or indirect, view of a physical, real-world environment which is augmented (or supplemented) by computer-generated sensory input such as sound, video, graphics, or GPS data in order to enhance the user's perception of reality. The augmentation is conventionally performed in real-time and in semantic context with environmental elements, e.g., showing a line of scrimmage on TV during a sporting event. Visual odometry has been used in robotics and computer vision and is the process of determining the position and orientation of a robot by analyzing the associated camera images.

FIGS. 1-8 are illustrations of a smart phone being used to manipulate various digital content by movement of the smart phone. Currently, a typical requirement for robust tracking of the camera is that the camera view includes a dominant planar structure with distinguishable points of high texture, as illustrated by textured planar surface 110 in FIG. 1. Examples of such surfaces may include a book cover with printed pictures and text, a painting on a wall, a carpeted floor, etc., for example. As long as points lying on a common scene plane are discernible by local texture, existing algorithms are able to locate the 3-D pose of the camera (and hence of the portable device) with respect to the plane. Typically, the origin of a virtual world coordinate frame is pinned to a point that lies on a world plane defined by the x-y axis and the z axis is defined to be perpendicular to this world plane. Referring to FIG. 1, origin point 111 is located approximately on surface 110, for example, such that the real world scene surface 110 and a virtual view frame such as frame 130 are approximately co-located. The 3-D pose of the camera may be produced in the form of a camera matrix P that defines how a point from the virtual world coordinate frame projects onto image coordinates used for a display screen for the mobile device that contains the camera. In this example, vector 120 represents the camera pose at a higher position while vector 122 represents the camera pose at a lower position after motion along the line 121, for example. Note that the requirement of planarity simply enables more robust estimation of camera pose with manageable computational load. This requirement may be relaxed as more robust pose tracking algorithms are developed. The user-interface described herein is fully applicable within the limitations of planarity and is extensible to other surface geometries as well.

Once the instantaneous 3-D pose of the camera is known, the digital content may be transformed to the virtual world coordinate frame. If the content is 3-D, the object models may be mapped so that their origin is referenced to the world coordinate origin 111, referring still to FIG. 1. If the content is 2-D, a virtual surface/manifold, F, of appropriate dimensions and shape may be defined on the world x-y plane (which may coincide with the scene plane). In mathematics, a manifold is a topological space that near each point resembles Euclidean space. More precisely, each point of an n-dimensional manifold has a neighborhood that is homeomorphic to the Euclidean space of dimension n. The 2-D content to be viewed may then texture mapped onto this surface, F, at an appropriate resolution.

For example, consider the task of viewing a picture M of dimension W×W pixels. For this, a virtual rectangle 130 of dimensions R×R units may be defined such that a picture M may be texture-mapped onto this rectangle at a resolution of W/R pixels per unit. Typically, a unit in virtual world space has no fixed relation to a standard distance unit such as inch or centimeter. The computer vision algorithms automatically determine some physical distance as a distance unit, and this is used as the yardstick until a new world coordinate frame is required. If the user wants this unit to coincide with one inch, for example, the user may need to indicate how long one inch on the world plane appears on the screen of the portable device. Doing so will enable the user to specify precisely the physical resolution of the texture mapped picture as if it were being printed, for example, "72 pixels per inch".

At this point, the 3-D position of the camera is known and the position and appearance of a virtual image, F, in the virtual world coordinate frame is known. This virtual surface may now be rendered to be displayed on a display screen of the mobile device from the viewpoint of the camera. This is an operation very common in graphics processing. In the simplest case, it involves simply utilizing the camera matrix P to project the texture mapped plane into the image coordinates and coloring the corresponding pixels in the image with appropriate colors.

This process will generate on the display screen of the device (typically the full screen of the device) an image as though the picture M was physically printed on the world plane. As the camera is moved in 3-D space, the projection matrix, P, of the camera is updated keeping the surface F static in world coordinates. At every frame, the virtual surface F is transformed to image coordinates using the updated camera matrix P. As a result, when the mobile device with the camera is moved around in 3D space, the picture M will appear "stuck", "pinned", or otherwise registered to the surface. The image on the screen of the mobile device will update appropriately showing those aspects of picture M as would be expected if the picture was actually laying on a surface in the real world and being viewed by the camera located in the mobile device.

In order to view digital content such as images, webpages, maps, etc., the user may use the above described technology to project the digital files onto a surface. The projection may be an actual image projection if the mobile device is equipped with an actual light projector. Miniature projectors, such as the DLP Pico Projector available from Texas Instruments, are gaining in popularity as they get embedded into light-weight portable consumer electronic devices such as smart phones and cameras. The projector on these devices is used as a display mechanism to project digital content onto any suitable surface. Projection of a distortion free image from a projector in a hand held device is described in more detail in U.S. patent application Ser. No. 14/102,320 "Maintaining Distortion-Free Projection from a Mobile Device," Manasvi Tickoo et al., filed Dec. 10, 2013 and is incorporated by reference herein.

Alternatively, or simultaneously, a virtual projection may be created by a graphics overlay on the scene image. The projection remains rigidly aligned (or "pinned") to the scene surface, which in turn is fixed within the reference 3-D coordinate space. The screen on the portable device now behaves as a viewport into this virtual surface. Several viewing options will be described in more detail below.

Figure 2:
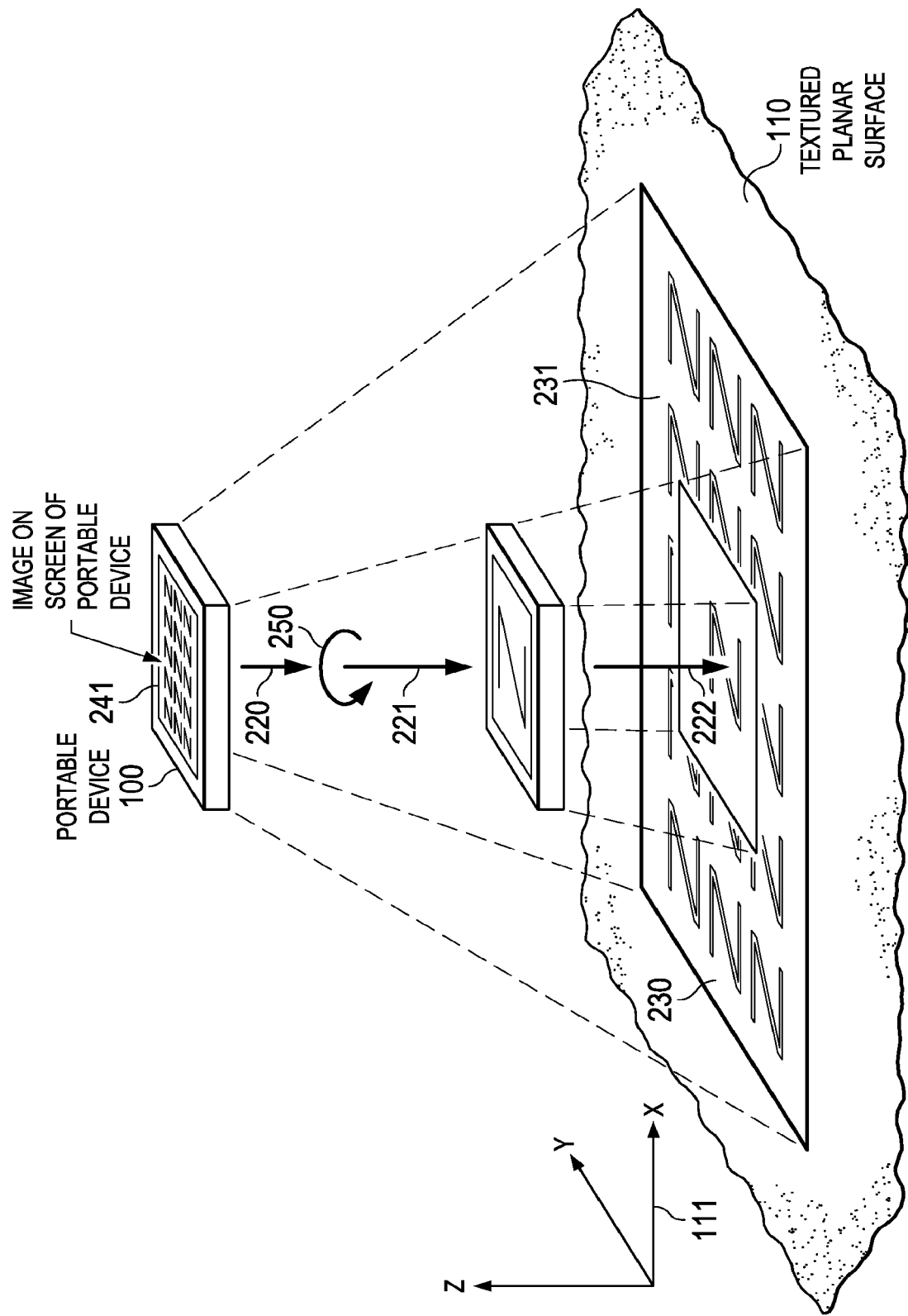

FIG. 2 is an illustration of a smart phone 100 being used to zoom digital content by movement of the smart phone. As discussed above, a virtual image 231 may be formed for an application program, for example, within a virtual frame 230 that defines a view surface that roughly coincides with textured surface 110. The image may be a picture, a video sequence, 2D, or 3D graphical image of objects and/or text, etc., for example. This virtual image may exist only in the virtual world coordinate system tied to origin 111 as described above and be viewed as an image 241 on the display screen of mobile device 100. This image may also form an actual image on surface 110 if mobile device 100 includes a projector. In either case, in order to zoom into the content, the user may move device 100 in direction 221 towards surface 110. As device 100 moves along track 221, the camera pose initially represented by pose vector 220 is updated as the camera observes various texture indicia within textured surface 110. As the camera gets closer to surface 110, camera pose 222 relative to origin point 111 may be interpreted as a zoom in operation and the image 241 displayed on mobile device 100 is zoomed in accordingly. In a similar manner, if the virtual image was actually being projected onto surface 110, the projected image may also be zoomed-in in response to the changed camera pose 222. Similarly, moving device 100 away from surface 110 may be interpreted as a zoom out operation and the image displayed by device 100 on its display screen and/or a projected imaged may be zoomed out.

Figure 3:
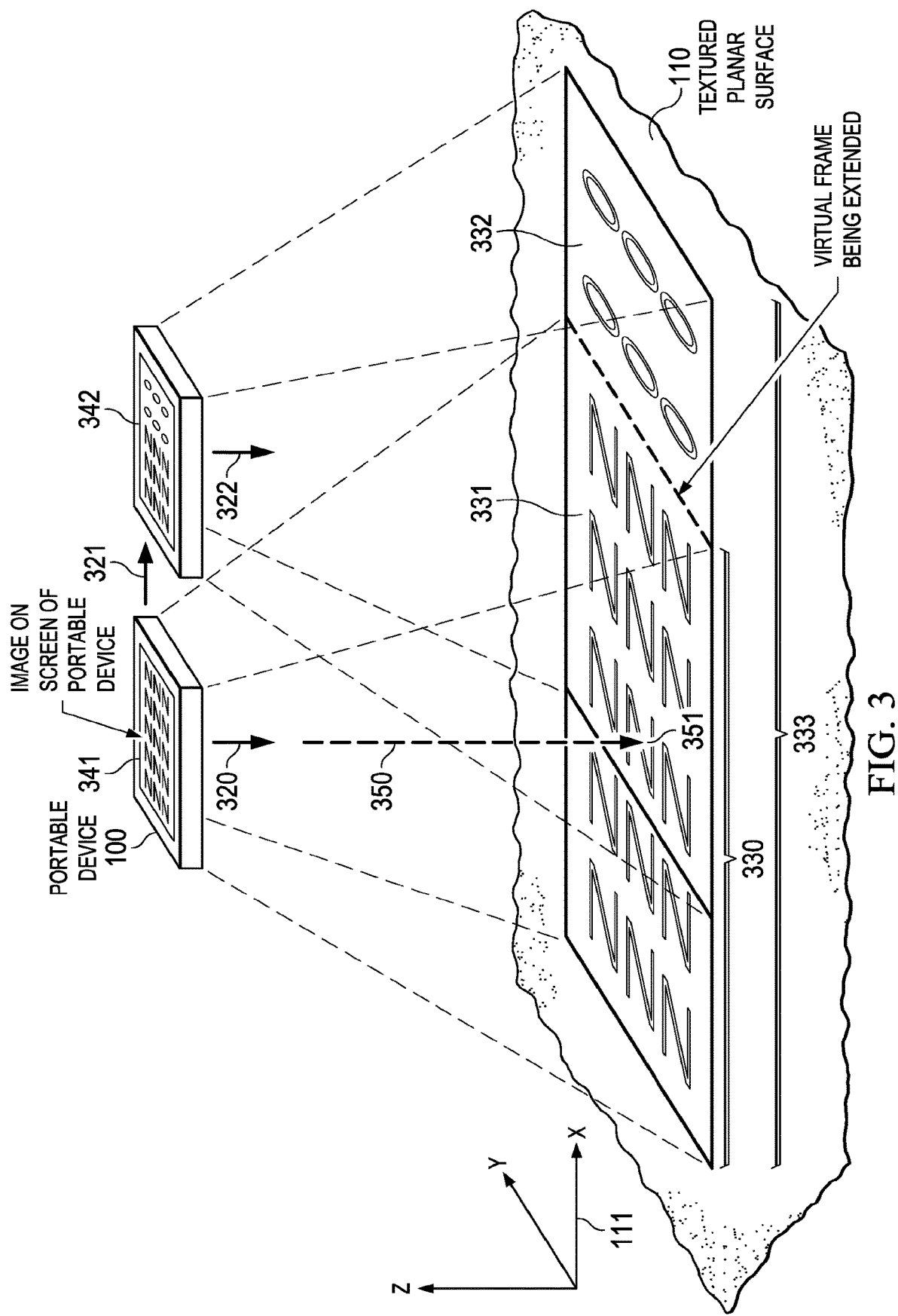

FIG. 3 is an illustration of a smart phone 100 being used to pan digital content by movement of the smart phone. On a desktop computer a user is able to resize the window of an application on the computer screen. Depending on the application, this resizing affects the content in different ways. One typical effect is the re-sizing (or scaling) of the application display. A second effect is to reveal more content of the application. An example for this latter behavior is typically seen in map applications. Here, when the window is increased in size, more of the map is displayed in the window. A direct consequence of the limited screen-size on mobile devices is that the window size of an application is typically fixed. The user is unable to re-size the window, or, at best, is allowed a small range of sizes limited by the physical dimensions of the screen. Embodiments of an improved user-interface model described herein may eliminate this restriction and enable the user to re-size application windows using natural hand movements.

As described above, the digital content may be projected on a virtual surface that may be approximately coplanar with a physical textured surface 110. Let the content be placed within a rectangular frame, F, on the virtual surface, as indicated at 330. As the user moves the device laterally to the edge of frame F, the frame F may be extended in the direction of the device movement to create a larger frame F', as indicated at 333. The content 331 originally associated with frame F continues to be registered to that part of the surface. New content 332 from the application is registered with the new parts of frame F'. Now the user may view the larger application window on this virtual surface by moving the device back and forth as illustrated in FIG. 3. Applications where this window resizing mode can be of specific interest is in displaying and viewing large-format content such as maps, newspapers, high resolution panoramic images, etc.

In order to extend the virtual content frame, the user may move device 100 in space laterally as indicated by 321 with respect to the surface 110. As the pose and position of the device changes from pose 320 to pose 322, the user sees the appropriate aspect of the digital content on the viewport as if it were registered (or pinned) to the surface. In this example, original virtual image 331 and viewport image 341 is extended to add additional image data 332 and the image 342 displayed on mobile device 100 is extended accordingly. In a similar manner, if the virtual image was actually being projected onto surface 110, the projected image may also be extended in response to the changed camera pose 322.

Figure 4:
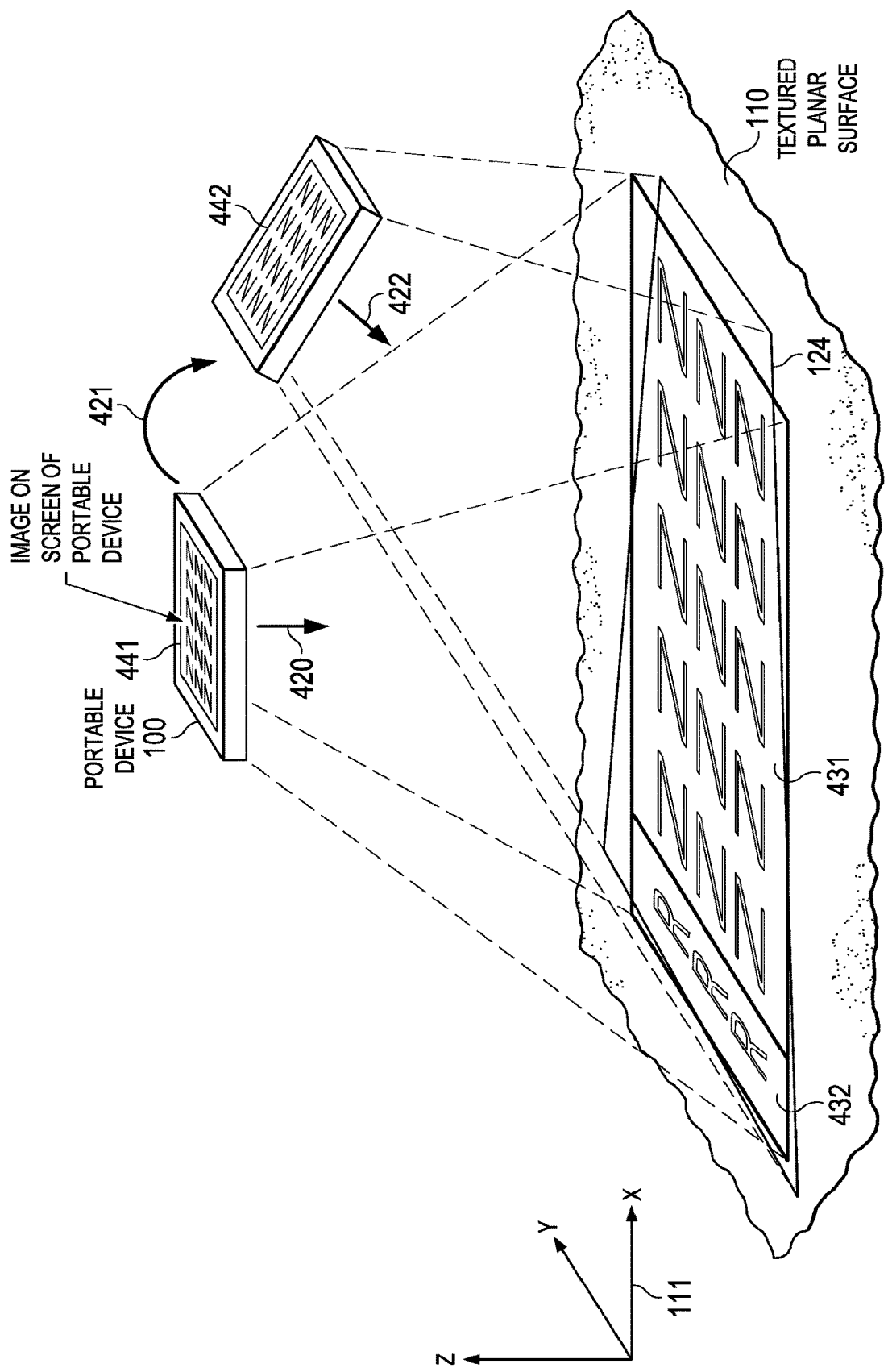

FIG. 4 is an illustration of a smart phone 100 being used to pan or rotate digital content by movement of the smart phone. In order to pan or rotate the content, the user may move device 100 in space laterally with a rotational motion as indicated by 421 with respect to the surface 110. As the pose and position of the device changes from pose 420 to pose 422, the user sees the appropriate aspect (or perspective) of the digital content on the viewport as if it were registered (or pinned) to the surface. In this example, original virtual image 431 and viewport image 441 is rotated to add additional image data 432 and the image 442 displayed on mobile device 100 is rotated accordingly. In a similar manner, if the virtual image was actually being projected onto surface 110, the projected image may also be rotated in response to the changed camera pose 422.

Referring back to FIG. 3, in another mode of interface operation, a "point-and-hover" gesture may allow a user to select an object. This gesture may accomplish the same goal as the "point-and-click" action in conventional mouse interfaces. In this interface, the gesture has two parts: first, the user points at a region of interest; and second, the user indicates a selection. In order to recover where the user is pointing, in one embodiment of this invention, the center of the display may be treated as a virtual pointer. The display here can refer to either a projector display or a screen display. A virtual ray 350 originating from the camera (or projector) center and passing through the image plane 110, for example, may act like a virtual pointer. Calculating the intersection of this virtual ray with the virtual surface on which the projected content is overlaid provides the position of the pointer. As the user moves the device, the 3D position of the camera center is updated, and the ray-plane intersection point reveals where on the displayed content the user is pointing. As described above, the digital content remains static as though pinned on the surface even as the user moves the device.

In order to make a selection, the user may simply hold the device steady and continue pointing at the region of interest for a pre-defined period of time. Hovering the pointer over the region of interest in this way is a simple way to indicate to the user interface that a selection has been made.

For example, in order to follow a URL, the user may simply move the device until the virtual pointer 350 coincides with the displayed URL, such as item 351, and then hold the device steady for a pre-defined period of time to indicate a selection. The user-interface then communicates to the application that a "click" event has been generated, and the URL is opened.

Alternatively, the user may make a selection of an item that is being pointed to by virtual pointer 350 by tapping on a touch sensitive display screen, or by touching on a physical key or button located on an interface portion of mobile device 100, for example.

Referring back to FIG. 2, another interface mode will now be described. A "twist-to-zoom" gesture may be treated as analogous to the pinch-to-zoom action common in touch screen devices. Embodiments of the invention may provide a full six degrees of freedom (DOF) pose for the mobile device 100. This may allow identification of when device 100 is being rotated about the axis perpendicular to the virtual plane on which digital content is being displayed, as indicated by motion 250. As described above, the tracking logic in mobile device 100 knows where the user is pointing the device. Therefore, when a user wants to zoom into a particular region of the displayed content, the user may point the device at that region, and then rotate 250 the device about the axis perpendicular to the projection surface. The displayed content may then be panned and scaled so as to produce the effect of zooming into the desired region of the digital content. Depending on the implementation, rotating in one direction may correspond to zoom in, and the reverse direction may correspond to zoom out, for example.

FIGS. 5-8 are illustrations of a smart phone 100 being used to view different windows by movement of the smart phone. Another consequence of limited screen space on portable devices is that only a very small number of application windows can be displayed on the screen at the same time. Typically, only one application window is displayed at a time on the screen. The user then has to engage in a specific sequence of gestures or keyboard presses to switch from one application window to another. An embodiment of a user-interface as described herein may enable the user to extend the "desktop" space on a portable device to virtual surfaces around the user. Using the methods described above, a user may "pin" an application onto a surface by holding the device in a desired location, X, and orientation, Q, in space. The user can then move the device freely and continue working on a different application window on the portable device. In order to access (retrieve or query) the first application, the user simply holds the device in the same physical location, X, and orientation, Q. On doing so, the first application window appears on the user screen. The user can thus register several different applications with different device poses and switch between these applications by positioning the device in the appropriate pose.

Figure 5:
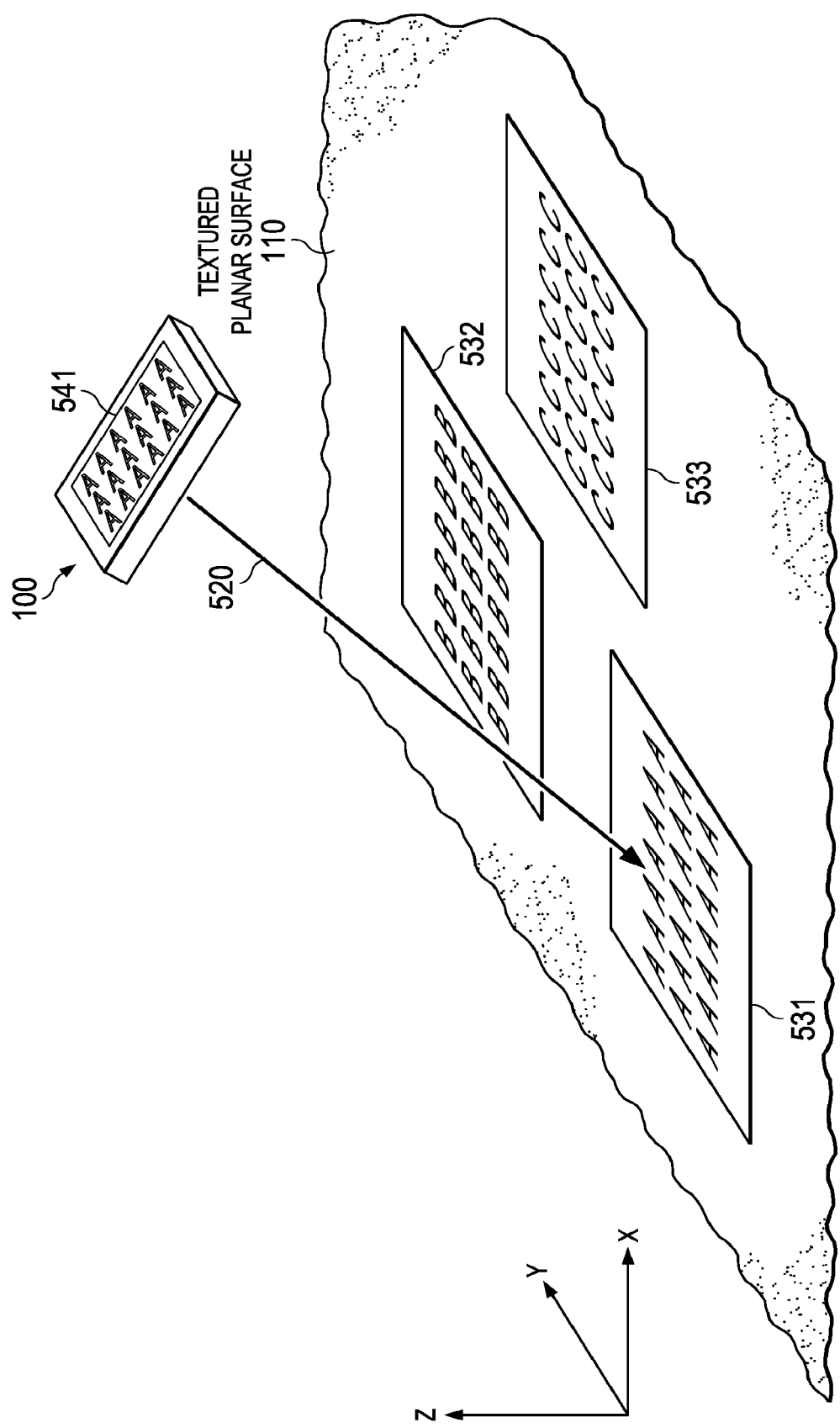
Figure 6:
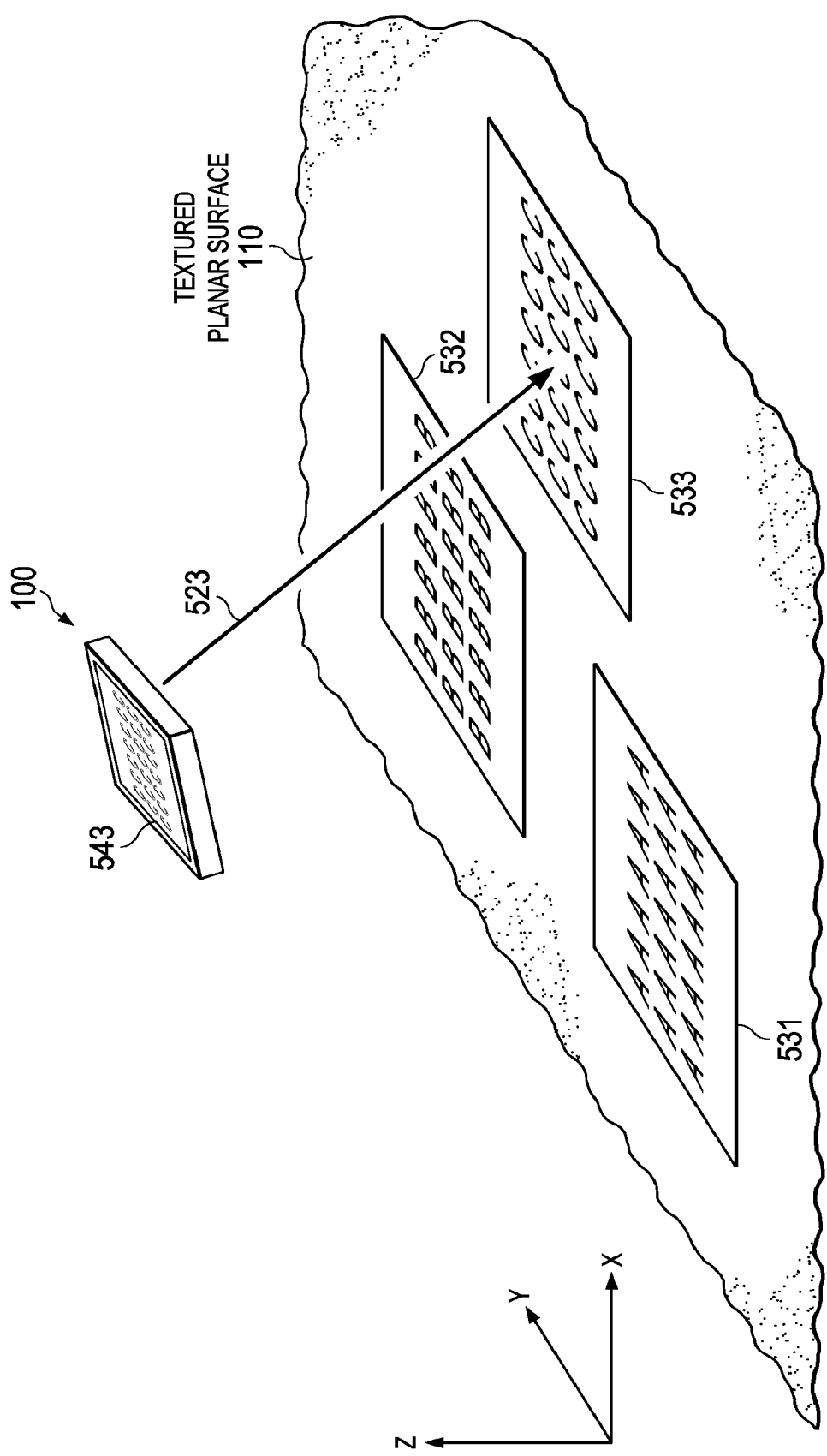

For example, FIG. 5 illustrates mobile device being held in a pose indicated by pose vector 520. In this pose, an application window 531 is selected and displayed 541 on a display screen of device 100. FIG. 6 illustrates mobile device 100 now be oriented to a pose indicated by pose vector 523. In this pose, an application window 533 is selected and displayed 543 on the display screen of device 100. In this example, three application windows 531-533 are illustrated on a virtual planar surface that is coplanar with textured surface 110, for example. More or fewer windows may be pinned to surface 110, for example.

Figure 7:
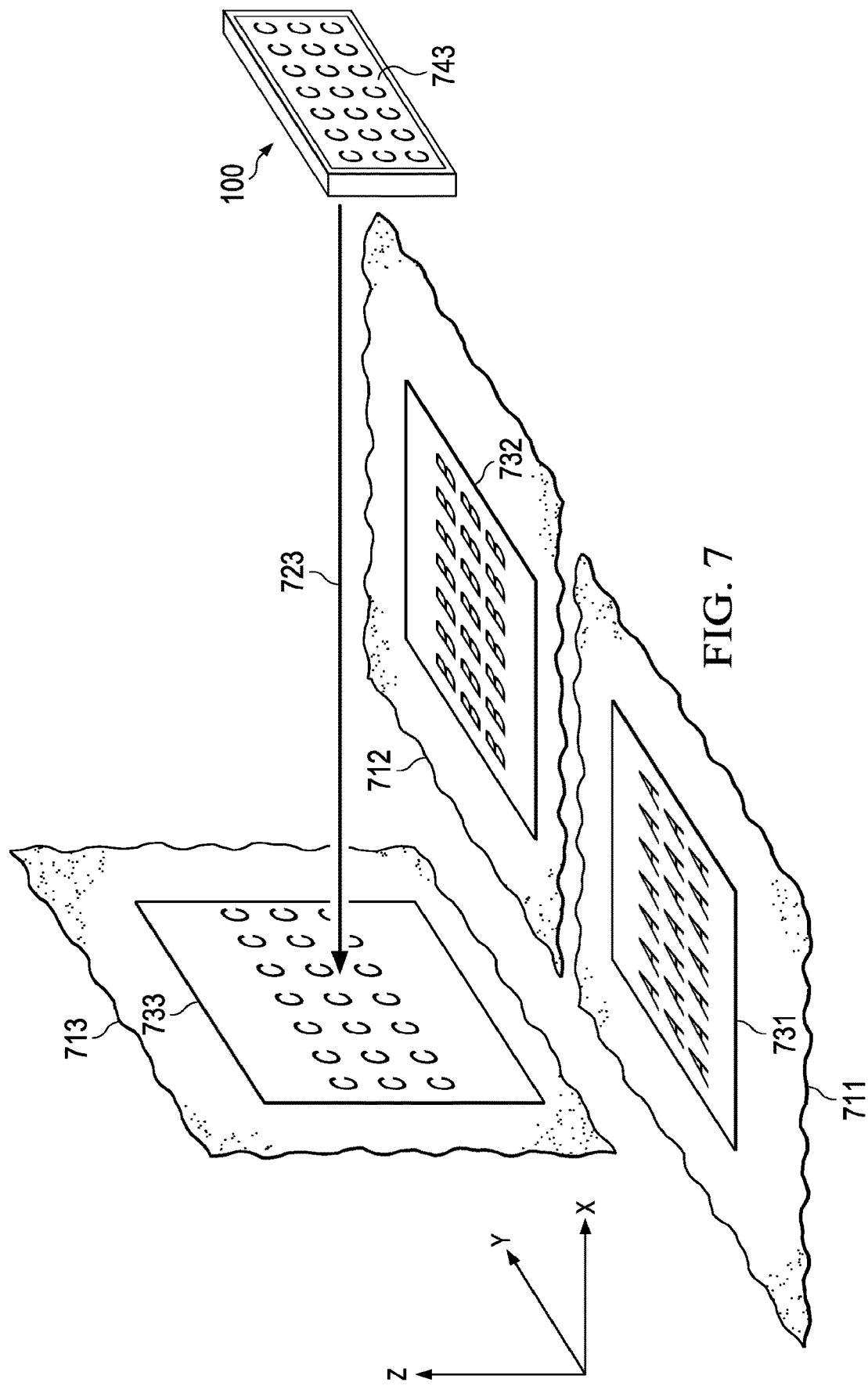
Figure 8:
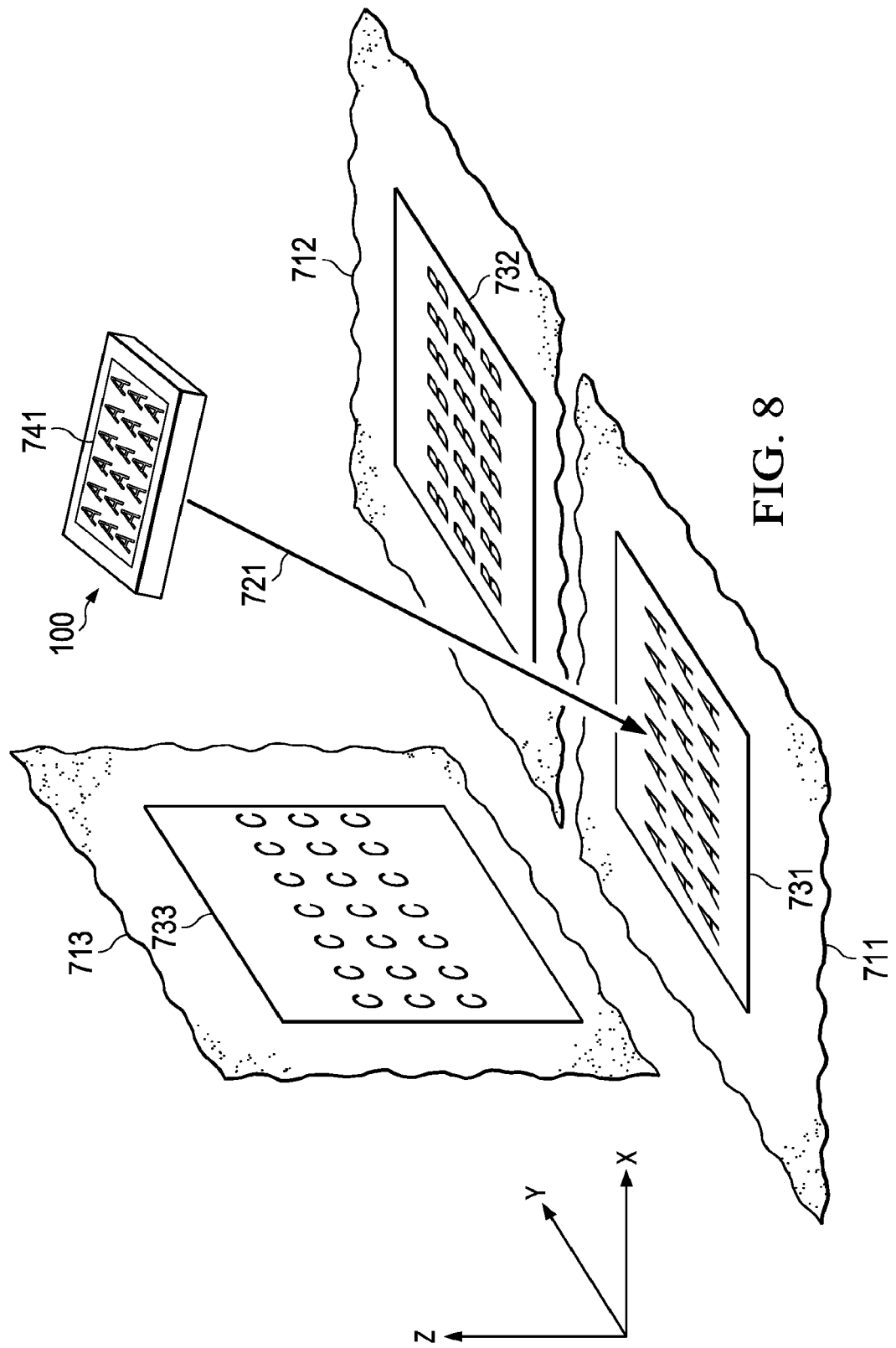

FIGS. 7 and 8 illustrate three real world surfaces 711-713 that may be oriented it different plane from each other. For example, surface 711 may be horizontal and may be a desktop or a floor, for example. Surface 712 may be a vertical wall, for example. Surface 712 may be another horizontal or vertical surface, for example. FIG. 7 illustrates mobile device 100 being held in pose 743. In this pose, an application window 733 is selected and displayed 743 on the display screen of device 100. FIG. 8 illustrates mobile device 100 being held in pose 741. In this pose, an application window 731 is selected and displayed 741 on the display screen of device 100.

Surface Considerations

Depending on the technology used to estimate the device pose, there may be restrictions to the user-interface modes described above. For example, for a vision-based system that relies on a camera on the device, the reference coordinate frame may be required to be registered with a textured planar surface. This implies that the user may need to point the device camera at a textured planar surface in order to create the virtual surface on which the content can be overlaid. Experiments have shown that for typical digital content commonly found in today's devices, this does not impair the user-experience in a significant way. In fact, since typical files such as images and web-pages are 2-D, it is preferable to render this content on a virtual surface that is coplanar with the physical plane on which the reference coordinate system is registered. Thus, a user can view the digital files as though they were "printed" on a real-world surface.

One implication of making the virtual surface coplanar with a physical surface is that an application window may only be resized up to the point that the same real-world plane is visible from the camera.

Referring again to FIGS. 7-8, where the various surfaces 711-713 may have different textures. For example, surface 713 may be a wall that has a particular color that is different from the color of surfaces 711 and 712. By detecting different surface textures and colors, an application may be associated with a visual signature of the surface. Consider registering an application to a surface by pointing the device camera at a real-world plane by holding the device at location X and pose Q with respect to the world coordinates associated with the real-world plane. Now, in order to retrieve or query that application, the user simply has to point the device camera back at that real-world plane, without necessarily positioning the camera at exactly the original location, X, and pose, Q. Obviously, if the query location and pose are very different from the original, the vision algorithms may struggle to recognize the surface, but fairly large amounts of deviation in location and pose are typically tolerable. Such a vision-based approach has the additional benefit of letting the user associate an application with a physical real-world planar surface, as opposed to the more intangible association with a device pose.

Thus, in various embodiments of user interfaces that use one or several of the capabilities described above, a user may interact with and manipulate the content being displayed by device 100 using natural hand movements.

Previous solutions to address the limited screen space on portable devices do not provide the capabilities described herein. For example, navigational icons may be provided to zoom and pan that are accessed via touch, key presses, or pointing devices such as a track ball. Small screen and keyboards of portable devices makes it cumbersome to access these navigational icons.

In other examples, gestures of the hand or head may include 'pinch and zoom' and 'drag' gestures for touch-screen displays. Head movement based controls have been proposed to provide 'lean and zoom' which zooms the content when the user leans towards the device. These approaches require learning a specific 'language' of gestures. The 'pinch' and 'drag' gestures are popular, but have shortcomings such as often requiring touching the screen and requiring the use of both hands.

A related application of the use of camera pose tracking is called "Augmented Reality". AR applications focus on photorealistic blending of virtual elements and real video. Most often, these virtual elements are 3-D models specifically designed for a domain-specific application. The user interface models described herein are different from typical Augmented Reality applications in the several ways. First, the real video stream is of secondary importance in the interface models described herein; the primary importance is utilizing the camera pose with respect to a world coordinate system to visualize digital content.

AR applications are predominantly domain-specific and are focused on photorealistic rendering of 3-D and 2-D models specifically designed for the application. The user interface models described herein treats AR as a mode of user-interface that enables viewing and manipulation of common digital content such as text files, images, maps, web-pages etc. The approach is agnostic to the content, and the dimensionality of the content (2-D, 3-D etc.). In contrast to residing in the "application space" of an operating system, the user interface models described herein may be integrated into mobile operating systems to enable the tracking of the device, the rendering of common digital files, and the translation and utilization of the camera pose as a pointing/gesturing device.

Examples of Motion Controlled User Interfaces

As describe herein, natural movement of a portable device may be utilized to control and manipulate digital content. For example, a user can choose to "pin" an image onto a surface and zoom and pan around the image by simply moving the camera closer to the image and then moving the camera laterally. Existing solutions require complex, finely orchestrated interactions with a small screen or keyboard to perform the same functionality.

As described herein, natural movement of a portable device may be utilized to re-size application windows. Depending on the application, a panning lateral gesture of the device may result in increasing the size of the virtual application window.

As described herein, one-handed gestures may be utilized to point and select and also to zoom in and zoom out.

As described herein, natural planar surfaces may be utilized as extensions of the limited "desktop" space on portable devices. This enables users to have several open application windows "pinned" to surfaces around them which can be accessed/viewed/queried by simply pointing/positioning the device camera appropriately.

During use of the user interface described herein, a user may use various overt commands to pin a particular application window to a particular surface location, such as: by tapping on a touch sensitive screen, by tapping a key or control button on the mobile device, etc., for example. A user may select which applications are being displayed by various known or later developed techniques, such as: by selecting from icons displayed on the display screen, selecting from screen based menus or tabs, etc., for example.

During use of the user interface described herein, a user may use various overt commands to indicate when content should be manipulated in response to motion, such as: by tapping on a touch sensitive screen, by tapping or holding a key or control button on the mobile device, etc., for example.

Figure 9:
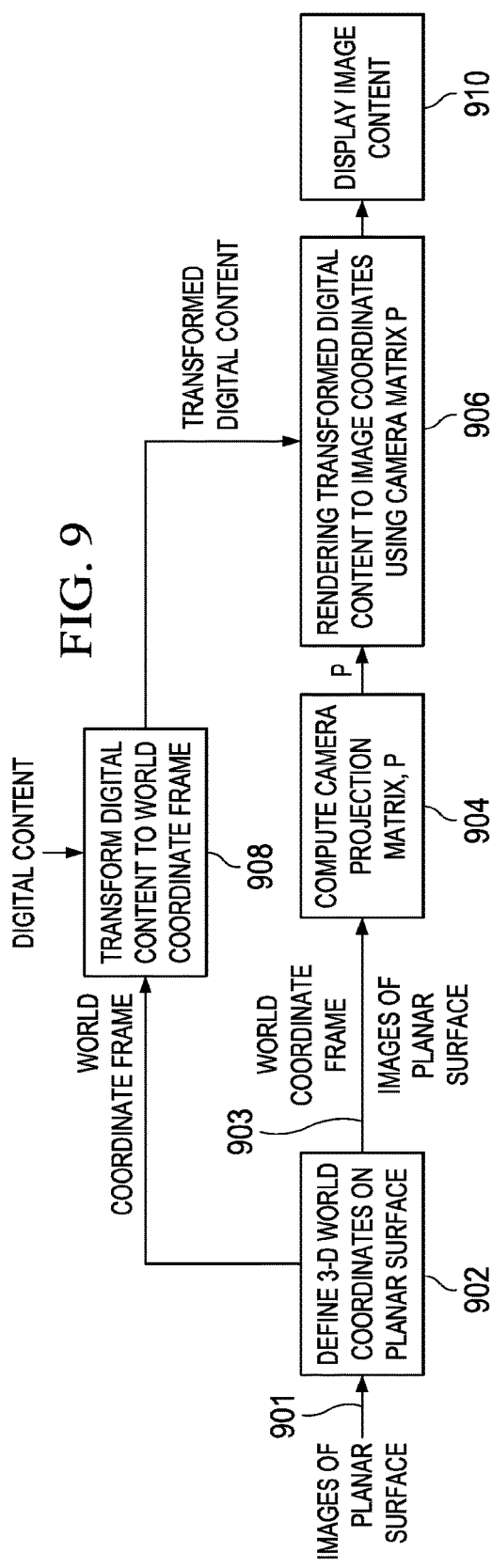
FIG. 9 is a flow chart illustrating use of natural hand movements of a hand-held device to manipulate digital content.

FIG. 9 is a flow chart illustrating use of natural hand movements of a hand-held device to manipulate digital content. As described in more detail above, a mobile device has a camera, ideally located with a view to the rear of the device opposite from the display screen. The camera needs to be on (active) while the motion controlled user interface is being used in order to provide a stream of scene images 901 to a user interface control function within the hand-held device.

Currently, a typical requirement for robust tracking of the camera is that the camera view includes a dominant planar structure with distinguishable points of high texture. Examples of such surfaces may include a book cover with printed pictures and text, a painting on a wall, a carpeted floor, etc., for example. As long as points lying on a common scene plane are discernible by local texture, existing algorithms are able to locate the 3-D pose of the camera (and hence of the portable device) with respect to the plane. Typically, the origin of a virtual world coordinate frame may be defined 902 as being pinned to a point that lies on a virtual world plane defined by an x-y axis, wherein the z axis is defined to be perpendicular to this world plane. In some embodiments, the virtual world plane may be coplanar the dominant real world planar structure. In other embodiments, the may be several real world planar structures, such as illustrated in FIGS. 7-8 for example.

As the user interface is being used, a user may move the hand-held device in various natural movements, as described in more detail above. The stream of scene images continues to be received 903 and used to determine the pose of the camera in a periodic manner. The 3-D pose of the camera may be produced 904 in the form of a camera matrix P that defines how a point from the world coordinate frame projects onto image coordinates used for a display screen for the mobile device that contains the camera.

Simultaneously, digital data that is to be displayed on the display screen of the hand-held device is transformed 908 to be referenced to the virtual world coordinate system. If the content is 3-D, the object models may be mapped so that their origin is referenced to the world coordinate origin. If the content is 2-D, a virtual surface/manifold, F, of appropriate dimensions and shape is defined on the virtual world x-y plane. In mathematics, a manifold is a topological space that near each point resembles Euclidean space. More precisely, each point of an n-dimensional manifold has a neighborhood that is homeomorphic to the Euclidean space of dimension n. The 2-D content to be viewed may then texture mapped onto this surface, F, at an appropriate resolution, as described in more detail above.

At this point, the 3-D position of the camera is known 904 and the position and appearance of a virtual image, F, in the world coordinate frame is known 908. This virtual surface may now be rendered 906 to be displayed on a display screen of the mobile device from the viewpoint of the camera. This is an operation very common in graphics processing. In the simplest case, it involves simply utilizing the camera matrix P to project 906 the texture mapped plane into the image coordinates and coloring the corresponding pixels in the image with appropriate colors.

This process will generate 910 on the display screen of the device (typically the full screen of the device) an image as though the picture M was physically printed on the world plane. As the camera is moved in 3-D space, the projection matrix, P, of the camera is updated keeping the surface F static in world coordinates. At every frame, the virtual surface F is transformed to image coordinates using the updated camera matrix P. As a result, when the mobile device with the camera is moved around in 3D space, the picture M will appear "stuck", "pinned", or otherwise registered to the surface. The image on the screen of the mobile device will update appropriately showing those aspects of picture M as would be expected if the picture was actually laying on a surface in the real world and being viewed by the camera located in the mobile device.

Camera

Figure 10:
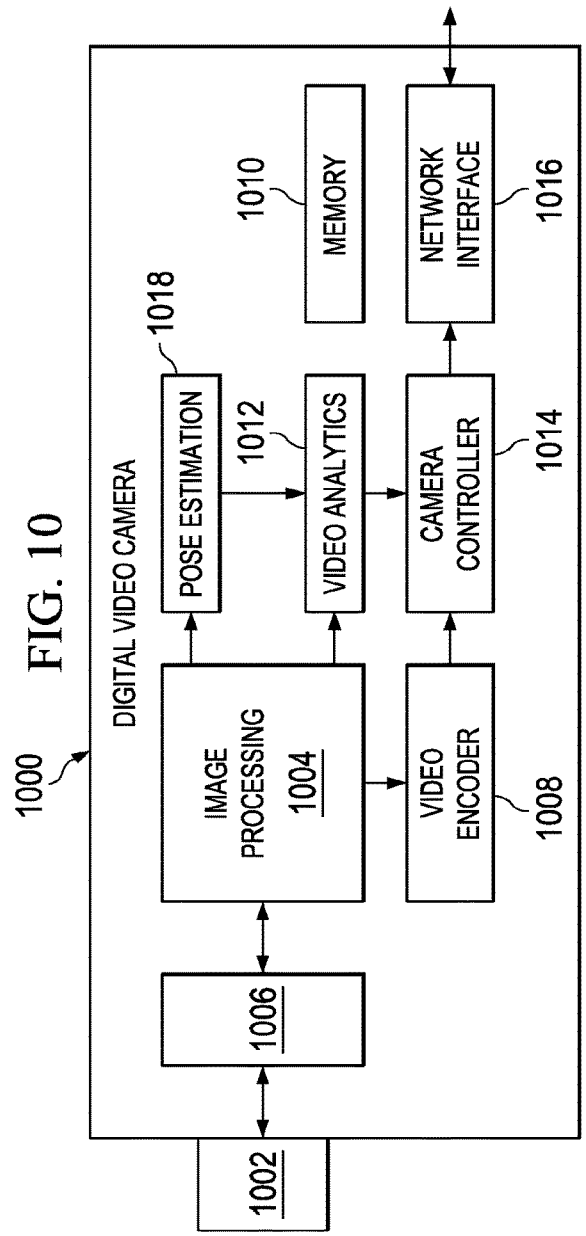
FIG. 10 is a block diagram of a digital camera contained within the smart phones of FIGS. 1-8.

FIG. 10 is a block diagram of a digital camera 1000 contained within the smart phones 100 of FIGS. 1-8. Digital video camera 1000 may be configured to perform pose estimation as described herein. Camera 1000 may include an imaging component 1002, a controller component 1006, an image processing component 1004, a video encoder component 1018, a memory component 1010, a video analytics component 1012, a camera controller 1014, and a network interface 1016. The components of the camera 1000 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc. Further, software instructions such as software instructions embodying at least part of the pose estimation may be stored in memory in the memory component 1010 and executed by one or more processors.

The imaging component 1002 and the controller component 1006 include functionality for capturing images of a scene. The imaging component 1002 may include a lens assembly, a lens actuator, an aperture, and an imaging sensor. The imaging component 1002 may also include circuitry for controlling various aspects of the operation of the component, such as, for example, aperture opening amount, exposure time, etc. The controller module 1006 includes functionality to convey control information from the camera controller 1014 to the imaging component 1002, and to provide digital image signals to the image processing component 1004.

The image processing component 1004 divides the incoming digital signals into frames of pixels and may process each frame to enhance the image data in the frame. The processing performed may include one or more image enhancement techniques, such as, for example, one or more of black clamping, fault pixel correction, color filter array (CFA) interpolation, gamma correction, white balancing, color space conversion, edge enhancement, denoising, contrast enhancement, detection of the quality of the lens focus for auto focusing, and detection of average scene brightness for auto exposure adjustment. Digital images from the image processing component 1004 are provided to the video encoder component 1008, the pose estimation component 1018, and the video analytics component 1012.

The video encoder component 1008 may encode the images in accordance with a video compression standard such as, for example, the Moving Picture Experts Group (MPEG) video compression standards, e.g., MPEG-1, MPEG-2, and MPEG-4, the ITU-T video compressions standards, e.g., H.263 and H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), the ITU-T/ISO High Efficiency Video Coding (HEVC) standard, etc.

The memory component 1010 may be on-chip memory, external memory, or a combination thereof. Any suitable memory design may be used. For example, the memory component 1010 may include static random access memory (SRAM), dynamic random access memory (DRAM), synchronous DRAM (SDRAM), read-only memory (ROM), flash memory, a combination thereof, or the like. Various components in the digital video camera 1000 may store information in memory in the memory component 1010 as a video stream is processed. For example, the video encoder component 1008 may store reference data in a memory of the memory component 1010 for use in encoding frames in the video stream. Further, the memory component 1010 may store any software instructions that are executed by one or more processors (not shown) to perform some or all of the described functionality of the various components.

Some or all of the software instructions may be initially stored in a computer-readable medium such as a compact disc (CD), a diskette, a tape, a file, memory, or any other computer readable storage device and loaded and stored on the digital video camera 300. In some cases, the software instructions may also be sold in a computer program product, which includes the computer-readable medium and packaging materials for the computer-readable medium. In some cases, the software instructions may be distributed to the digital video camera 1000 via removable computer readable media (e.g., floppy disk, optical disk, flash memory, universal serial bus (USB) key), via a transmission path from computer readable media on another computer system (e.g., a server), etc.

The camera controller component 1014 may control the overall functioning of the digital video camera 1000. For example, the camera controller component 1014 may adjust the focus and/or exposure of the imaging component 1002 based on the focus quality and scene brightness, respectively, determined by the image processing component 1004. The camera controller component 1014 also controls the transmission of the encoded video stream via the network interface component 1016 and may control reception and response to camera control information received via the network interface component 1016. Further, the camera controller component 1014 controls the transfer information from the video analytics component 1012 via the network interface component 1016.

The interface component 1016 allows the digital video camera 1000 to communicate with a monitoring system located within the mobile device.

The video analytics component 1012 analyzes the content of images in the captured video stream to detect and determine temporal events not based on a single image. The analysis capabilities of the video analytics component 1012 may vary in embodiments depending on such factors as the processing capability of the digital video camera 1000, the particular application for which the digital video camera is being used, etc. For example, the analysis capabilities may range from video motion detection in which motion is detected with respect to a fixed background model to face recognition, object recognition, gesture recognition, feature detection and tracking, etc. As part of the analysis of the content of images, the video analytics component 1012 may use the estimated pose from the pose estimation component 1018. The pose estimation component 1018 includes functionality to determine an initial pose of the camera 1000 when an application needing pose estimation is started, to track the current pose of the camera 1000, and to recover (re-initialize) the pose of the camera 1000 in the event that incoming images are not sufficient (e.g., due to noise or temporal inconsistencies such as motion blur or dropped frames) to continue the pose tracking. The pose estimation component 1018 may be configured to perform a method for pose estimation as described herein in reference to FIG. 11.

Pose Tracking

Figure 11:
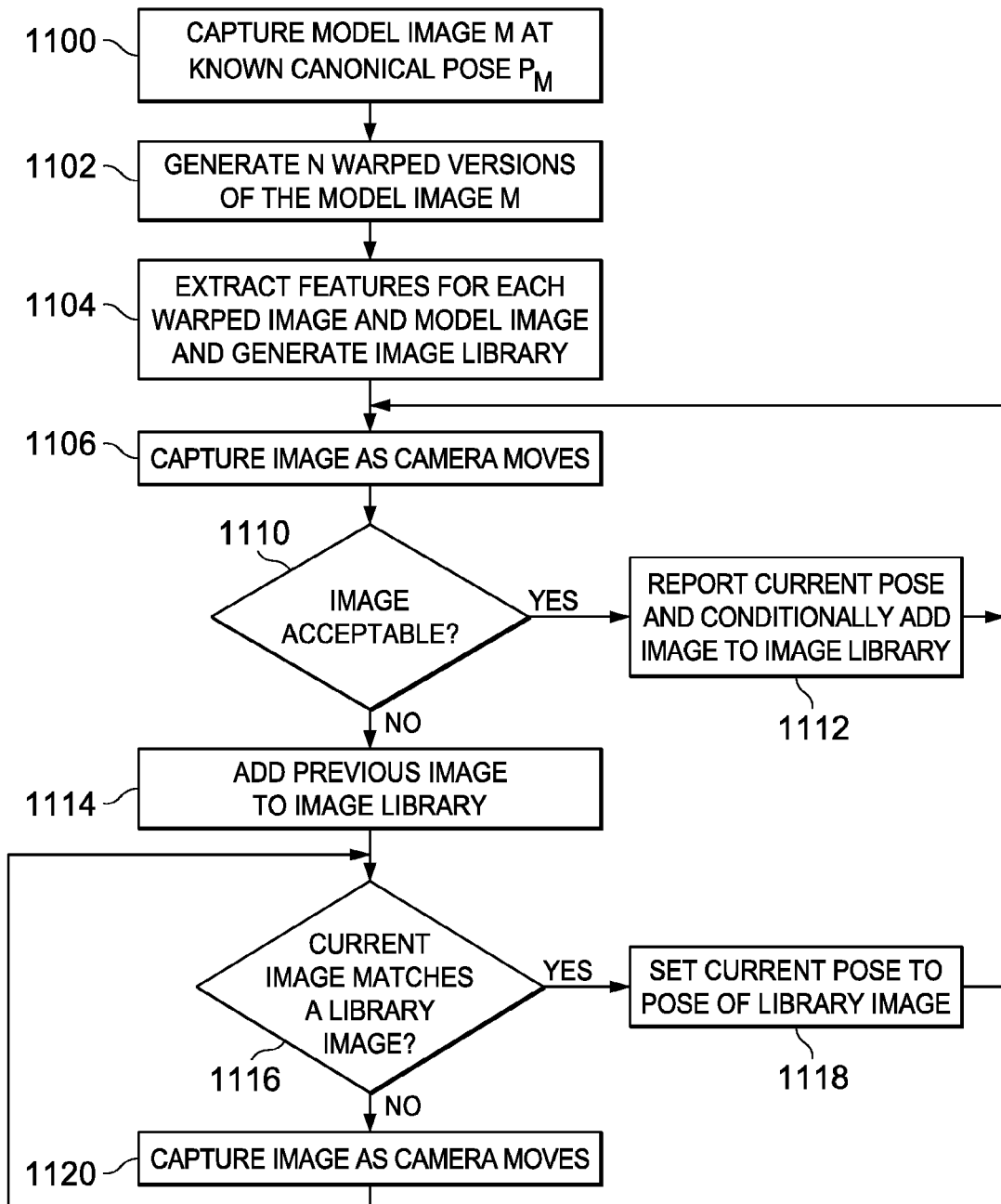
FIGS. 11 and 12 illustrate a method for determining camera pose.

FIG. 11 is a flow diagram of a method for camera pose estimation that may be performed, for example, in a digital camera such as that of FIG. 10. This method is described in more detail in U.S. patent application Ser. No. 14/051,161 filed Oct. 10, 2013, entitled "Camera Pose Estimation" which is incorporated by reference herein. This method may be viewed in three parts: pose estimation initialization, pose estimation normal operation, i.e., pose tracking, and pose estimation recovery. For initialization, e.g., at application start-up, a "model" image M is captured 1100 when the user is holding the projector in a desired orientation and designates the current projected image frame should be pinned to the projection surface. That is, the image M is captured when the camera is positioned in a user designated initial pose. The initial camera pose for this model image is denoted as PM.

Given the model image M, n transformed (warped) versions of the image may be generated 1102 by applying known transformations. That is, each of n warped images Wi, 1≤i≤n, are generated by applying a transformation Ti, to the model image M to generate an image Wi that replicates how the planar scene in the image M would appear if the camera is at a different pose, as shown by equation (4).

$$W_i = T_i(M) \quad (4)$$

Any suitable transformations may be used. The transformations Ti correspond to common (expected) poses relative to the model M. For example, if the scene is assumed to be planar, a common transformation that may be used is a homography which is a 3×3 matrix of nine parameters. The set of nine parameters of a homography matrix describes the perspective transformation of a planar scene. Each homography matrix corresponds to a particular rotation and translation (or pose) of a calibrated camera with respect to the planar scene. Application of this matrix to the model image M results in an image Wi corresponding to how the camera would see the scene when placed in a particular position corresponding to the parameters.

The effect of applying the transformation to the model image is to create n warped images, Wi, that capture the appearance of the planar scene of the model image from n different camera poses. That is, the transformations Ti simulate n known camera poses. Any suitable value of n, e.g., 80, may be used. Some factors that may be considered in the choice of the value of n include: 1) the larger the value of n, the larger the amount of time needed to generate the warped images and the larger the amount of memory needed to store the warped images and the associated pose data; 2) the larger the library, the longer the amount of time needed to search the library for matches (the importance of which will be apparent in later detailed description); and 3) n is sufficiently large such that the library is adequate for pose estimation (i.e., too few warped images will provide unsatisfactory results).

Features are also extracted 1104 and stored for each of the warped images Wi and the model image M. The features of the ith image are denoted by Fi. A feature typically corresponds to a point in the image and is represented by a descriptor that captures the appearance of the local neighborhood around that point. Any suitable technique may be used to compute the features for an image. An example of a suitable technique may be found in G. Klein and D. Murray, "Parallel Tracking and Mapping on a Camera Phone," Proc. Eighth International Symposium on Mixed and Augmented Reality, pp. 83-86, October, 2009, Orlando, Florida.

Note that the net effect of the pose estimation initialization, i.e., capturing the model image, generating the warped images, and extracting the features of each image, is the generation of a library, or set, of known images S={(F0, P0), (F1, P1), (F2, P2), (F3, P3) . . . (Fn, Pn)}. For simplicity, the model image is considered to be part of the set of images, i.e., let M=W0=T0 (M), where T0 is the identity matrix. The library of images may be stored in the memory 110 of the camera 100 of FIG. 10, for example.

Once the pose estimation is initialized, the pose tracking begins, i.e., the camera pose is continually updated and reported for images in the input video stream. Images are captured 1108 as the camera (or a device incorporating the camera) is moved. If an image captured at time t is acceptable 1110, e.g., the image is not too noisy and/or is temporally consistent, the current pose is reported 1112 to interested components, e.g., the video analytics component 1112. The image may also be added 1112 to the image library under certain conditions. In some embodiments, the number of images that may be added to the image library is limited to some number, e.g., 20, and new images are added in a first-in-first out (FIFO) fashion.

At time t, an image (i.e., the associated pose and computed features) is added to the image library if the following two conditions are satisfied. First, the condition t−s>D1 must be satisfied where s is the time when the last image was added to the image library and D1 is an elapsed time threshold. In other words, the current image is added if a sufficient amount of time D1 has passed since the last entry into the set. The value of D1 may be any suitable value. The choice of a value for D1 may depend on factors such as how fast the camera is expected to move for a particular application and how much memory and compute power the device has to process new entries in the library.

Second, the condition difference (Pt, Pi)>D2, for all Pi elements of the library S must be satisfied where D2 is a difference threshold. That is, the pose Pt of the current image must be sufficiently different from all the poses contained in the image library S. Any suitable technique may be used to determine the pose Pt. In some embodiments, a camera pose P may be represented as the [x, y, z] coordinates of the camera position and another triplet that represents the camera orientation. Thus, computation of the difference between the current pose Pt and the poses in the image library may be very efficient—how far apart are the two poses and the angle between the two poses.

The value of D2 may be any suitable value. The choice of a value for D2 may depend on factors such as how fast the camera is expected to move for a particular application and how much memory and compute power the device has to process new entries in the library. Note that if the values of D1 and/or D2 are low, many images may be added to the library, causing high load on system resources. Conversely, if the values of D1 and/or D2 are high, the library may not contain enough landmark images at different poses to effectively help in pose re-initialization.

Figure 12:
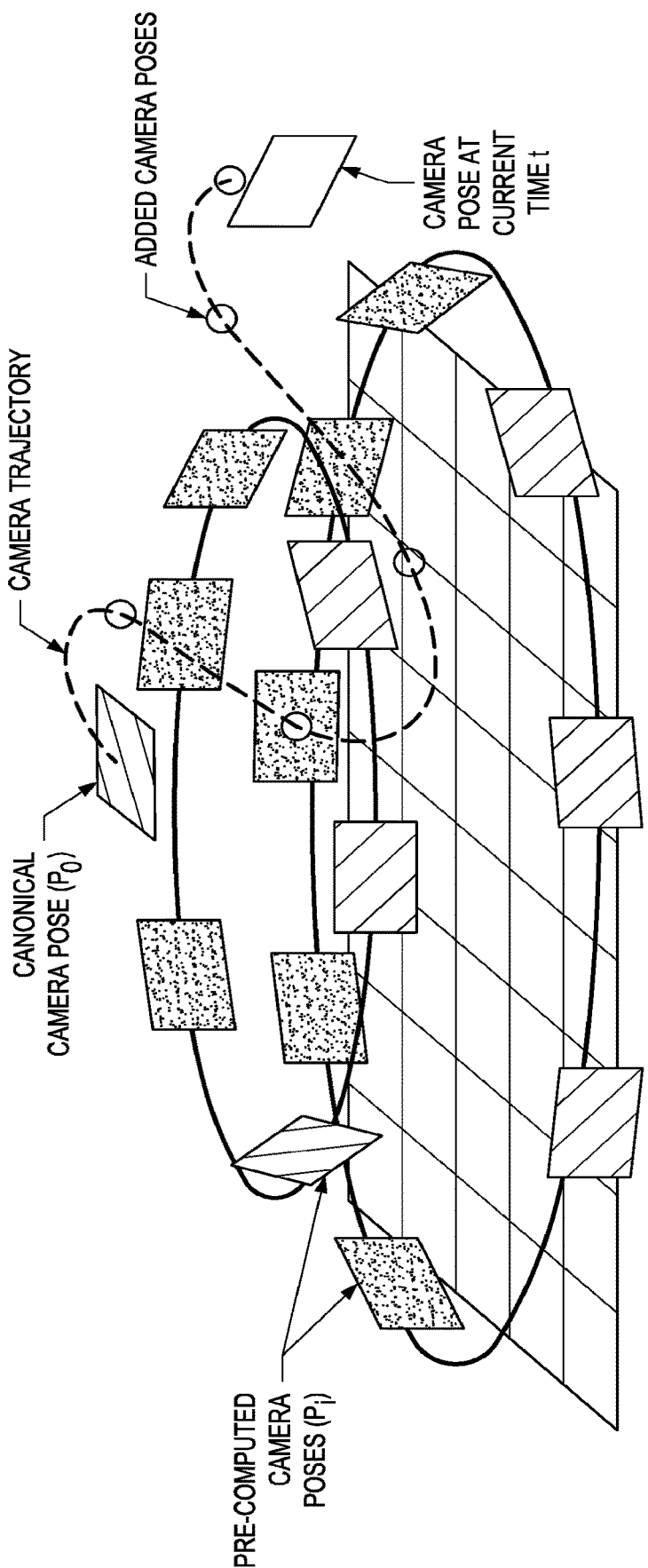

FIG. 12 is an example of a set of initial poses Pi, $0<=i<=n$, and camera poses added to the image library S as the camera is moved through the scene. This example shows the various initial poses in two rings or a hemisphere looking down at the scene. The different shadings indicate different poses in the three dimensional scene. The small circles indicate images/poses added to the image library as the camera is moved along the indicated trajectory.

Referring again to FIG. 11, if an image captured at time t, It, is not acceptable 1110, then the camera pose update cannot continue as the images being received are not suitable for continuing pose estimation without re-initialization. At this point, a pose estimation re-initialization phase is entered with the assumption that the camera is moved in space within the scene with the intent of resuming the user experience. The image captured at time t−1, i.e., the features of image It−1 and the corresponding pose Pt−1, are added 1114 to the image library. Since the pose update is interrupted at time t, the image at time t−1 is assumed to be captured at a valid pose.

After the image It−1 is added to the image library, an attempt is made to find a match 1116 between the current image It and an image in the image library (as augmented by images added as the camera was moved). If a match is found, then the current pose is set 1118 to the pose of the matching image and normal pose estimation processing continues 1108 with the next image. If no match is found 1116, then the next image is captured 1120 and an attempt is made to match 1116 this image with one of the images in the set of warped images. The capture and match process is repeated until a match is found and the pose is re-initialized.

Since the size of the image library (set) S can be large, the process of searching for the best match may be split across several time instances to enable real time processing. Any suitable approach may be used for searching the image library. One approach that may be used is as follows. First, the current image is compared to the most recent addition to the library S, i.e., It−1. If there is no match, then the current image is compared to the model image M. If there is no match, then the current image is compared against m other images in the image library.

All the comparisons may be done in feature space. That is, the features Ft of the image It are first compared to the features Ft−1 of the most recent image It−1 added to the library S. If the match score exceeds a pre-defined threshold, then the current image It matches with that image. Any suitable technique may be used to determine the match score. For example, the match score may be some form of distance measure between the features. In some embodiments, symmetric transfer error is used to quantify the match between feature sets. The value of the matching threshold may be determined empirically based on the amount of noise expected in the image capture process and the amount and speed of motion expected.

If the match score is below the threshold, the features Ft are compared to the features F0 of the model image M. If the match score is again below the threshold, then the features are compared to the features of a maximum of m images from the set. As soon as a satisfactory match is found, the pose is updated to the pose of the matching image. If none of the m images are a satisfactory match, the current camera pose is declared to be invalid, and the next input image, It+1 is processed. Again, Ft+1 is first compared to Ft−1. If there is no match, then Ft+1 is compared to F0. If there is no match, a new set of m library images are chosen for evaluation. The m images at time t+1 are distinct from those compared at time t. If no match is found, the same process repeats at time t+2, etc.

In this way, if there are n images in the library, n/m time instances are needed to search the entire library for a valid match. For example, assume that the library size is n=100, where there are 80 images corresponding the set of warped images generated at initialization, and 20 images corresponding to a circular buffer of images added to the image library during normal pose estimation. In order to meet real-time constraints, m may be limited to two. Therefore, during pose re-initialization, every input image is compared against the image $I_{t-1}$, the model image M, and at most two other library images until a match is found. The library images are exhausted after 50 input images. Then, as new input images are captured, the library is searched again. Assuming a modest processing rate of 15 fps, it may take about 3 seconds to search through a library of 100 images.

In another approach to tracking camera pose, the camera pose estimation algorithm may have a-priori knowledge of the background scene. In this approach, warped versions of the background scene are generated in an offline phase. Thus, to initialize or recover the camera pose estimate, the algorithm can compare input images against the pre-generated warped images to estimate the pose. This approach may be useful when the mobile device is used within a constrained space, for example.

In another approach, pose-invariant feature descriptors may be used. In this approach, the features, F, computed from an image are invariant to changes in camera pose. Thus, even as the camera pose changes from the first image 10, to image It at time t, the algorithm can establish sufficient matches between F0 and Ft to recover the camera pose at time t. While use of pose-invariant features is powerful, their use is very computationally intensive, and hence, currently not widely deployed for embedded real-time use.

System Example

Figure 13:
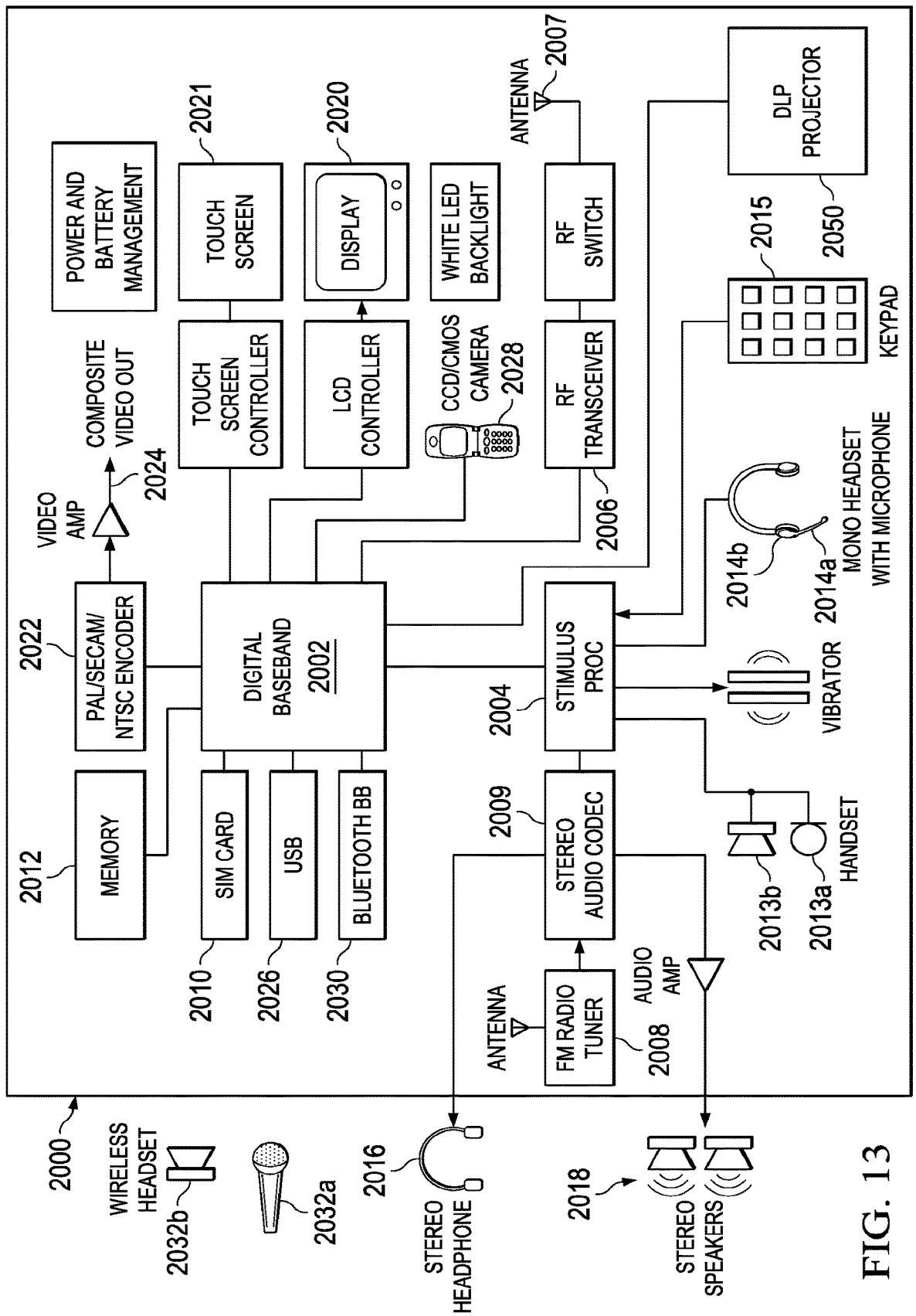
FIG. 13 is a more detailed block diagram of a smart phone with an embedded camera.

FIG. 13 is a block diagram of an exemplary mobile cellular smart phone 2000 that includes an embodiment of the present invention. Digital baseband (DBB) unit 2002 may include a digital processing processor system (DSP) that includes embedded memory and security features. Stimulus Processing (SP) unit 2004 receives a voice data stream from handset microphone 2013a and sends a voice data stream to handset mono speaker 2013b. SP unit 2004 also receives a voice data stream from microphone 2014a and sends a voice data stream to mono headset 2014b. Usually, SP and DBB are separate ICs. In most embodiments, SP does not embed a programmable processor core, but performs processing based on configuration of audio paths, filters, gains, etc. being setup by software running on the DBB. In an alternate embodiment, SP processing is performed on the same processor that performs DBB processing. In another embodiment, a separate DSP or other type of processor performs SP processing.

RF transceiver 2006 is a digital radio processor and includes a receiver for receiving a stream of coded data frames from a cellular base station via antenna 2007 and a transmitter for transmitting a stream of coded data frames to the cellular base station via antenna 2007. RF transceiver 2006 is coupled to DBB 2002 which provides processing of the frames of encoded data being received and transmitted by cell phone 2000.

DBB unit 2002 may send or receive data to various devices connected to universal serial bus (USB) port 2026. DBB 2002 can be connected to subscriber identity module (SIM) card 2010 and stores and retrieves information used for making calls via the cellular system. DBB 2002 can also be connected to memory 2012 that augments the onboard memory and is used for various processing needs. DBB 2002 can be connected to Bluetooth baseband unit 2030 for wireless connection to a microphone 2032a and headset 2032b for sending and receiving voice data. DBB 2002 may also be connected to display 2020 and can send information to it for interaction with a user of the mobile UE 2000 during a call process. Touch screen 2021 may be connected to DBB 2002 for haptic feedback. Display 2020 may also display pictures received from the network, from a local camera 2028, or from other sources such as USB 2026. DBB 2002 may also send a video stream to display 2020 that is received from various sources such as the cellular network via RF transceiver 2006 or camera 2028. DBB 2002 may also send a video stream to an external video display unit via encoder 2022 over composite output terminal 2024. Encoder unit 2022 can provide encoding according to PAL/SECAM/NTSC video standards. In some embodiments, audio codec 2009 receives an audio stream from FM Radio tuner 2008 and sends an audio stream to stereo headset 2016 and/or stereo speakers 2018. In other embodiments, there may be other sources of an audio stream, such a compact disc (CD) player, a solid state memory module, etc.

Camera 2028 may be implemented as described in more detail above with respect to FIG. 10, for example. Pose tracking functions may be performed as described in more detail above by logic within camera 2028, or by logic located elsewhere within smart phone 2000, for example. A user interface as described in more detail above may then be displayed on display 2020 and manipulated by using natural movements of hand-held smart phone 2000, as described in more detail above.

In some embodiments, a projector 2050 may be included. Projector 2050 may be a digital light processing (DLP) projector chip (available from Texas Instruments) that is operable to project a still image or a video stream onto a projection surface located several feet or several yards away from mobile device 2000.

Image data may be received from various sources, such as memory 2012, simcard 2010, memory within camera 2028, for example. Image data may be downloaded on a data channel from a cellular network, for example. Projector 2050 may be used to project a version of the user interface that is produced for display screen 2020, for example.

Other Embodiments

While the invention has been described with respect to a limited number of embodiments, those skilled in the art, having benefit of this disclosure, will appreciate that other embodiments can be devised which do not depart from the scope of the invention as disclosed herein. For example, embodiments are described herein in which features and poses are stored in an image library. One of ordinary skill in the art will understand embodiments in which rather than storing features in the library, the images and feature coordinates may be stored in a database or other file structure.

In some embodiments, a single processor may be used to execute instructions to perform camera image capture and pose tracking, and perform image data warping prior to displaying. In other embodiments, two or more processors may cooperate to perform the various tasks.

While embodiments of a smart phone were described herein, other embodiments may include various portable and hand-held devices, such as tablets, personal digital assistants, and other mobile digital devices that may have a relatively small display screen, for example.

Embodiments of the methods described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method comprising:
capturing, by a camera, a first image at a first pose;
applying, by a processor, a transformation to the first image to generate a warped model image;
extracting, by the processor, warped model features from the warped model image and model features from the first image;
storing, by the processor, the warped model features and the model features in an image library;
capturing, by the camera, a second image at a second pose;
tracking, by the processor, a current pose of the camera based on the second image and the image library.

2. The method of claim 1, wherein:
the first pose is associated with an orientation of a projector and a projection surface for projector images.

3. The method of claim 1, wherein:
the transformation includes a homography having a 3×3 matrix of nine parameters.

4. The method of claim 1, wherein:
the transformation is a plurality of transformations N;
the warped model image includes an N number of warped model images; and
each of the plurality of transformations N are applied, by the processor, to the model image to generate the N number of warped model images.

5. The method of claim 4, wherein:
the plurality of transformations N are based on one of:
an amount of time needed to generate the N number of warped model images;
an amount of memory needed to store the N number of warped model images and associated pose data;
a search time for matches in the image library; and
a quality level.

6. The method of claim 1, wherein:
the second pose is different from the first pose.

7. The method of claim 1, wherein:
the second image includes a plurality of images taken as the camera is moved from the first pose.

8. The method of claim 1, wherein:
the first image is captured at a first time at a first position;
the second image is captured at a second time at a second position; and
the second image is added to the image library in response to:
- a first difference between the second time and the first time being greater than a first threshold; and
- a second difference between the second position and the first position being greater than a second threshold.

9. The method of claim 1, further comprising:
storing, by the processor, the second image in the image library;
capturing, by the camera, a third image;
comparing, by the processor, the third image with images stored in the image library; and
in response to a match of the third image with one of the images stored in the image library, setting, by the processor, a current pose to a matching image pose of one of the images stored in the image library.

10. The method of claim 9, further comprising:
in response to the third image not matching with one of the images stored in the image library, capturing, by the camera, a fourth image; and
comparing, by the processor, the fourth image with the images stored in the image library.

11. A system comprising:
a camera configured to:
  capture a first image at a first pose; and
  capture a second image at a second pose; and
a processor configured to:
  apply a transformation to the first image to generate a warped model image;
  extract a warped model features from the warped model image and model features from the first image;
  store the warped model features and the model features in an image library; and
  track a current pose of the camera based on the second image and the image library.

12. The system of claim 11, wherein:
the first pose is associated with an orientation of a projector and a projection surface for projector images.

13. The system of claim 11, wherein:
the transformation includes a homography having a 3×3 matrix of nine parameters.

14. The system of claim 11, wherein:
the transformation is a plurality of transformations N;
the warped model image includes an N number of warped model images; and
each of the plurality of transformations N are applied, by the processor, to the model image to generate the N number of warped model images.

15. The system of claim 14, wherein:
the plurality of transformations N are based on one of:
  an amount of time needed to generate the N number of warped model images;
  an amount of memory needed to store the N number of warped model images and associated pose data;
  a search time for matches in the image library; and
  a quality level.

16. The system of claim 11, wherein:
the second pose is different from the first pose.

17. The system of claim 11, wherein:
the second image includes a plurality of images taken as the camera is moved from the first pose.

18. The system of claim 11, wherein:
the first image is captured at a first time at a first position;
the second image is captured at a second time at a second position; and
the second image is added to the image library in response to:
  a first difference between the second time and the first time being greater than a first threshold; and
  a second difference between the second position and the first position being greater than a second threshold.

19. The system of claim 11, wherein:
the camera is further configured to capture a third image; and
the processor is further configured to:
  store the second image in the image library;
  compare the third image with images stored in the image library; and
  in response to a match of the third image with one of the images stored in the image library, set a current pose to a matching image pose of one of the images stored in the image library.

20. The system of claim 19, wherein:
in response to the third image not matching with one of the images stored in the image library:
  the camera is further configured to capture a fourth image; and
  the processor is further configured to compare the fourth image with the images stored in the image library.

* * * * *